United States Patent [19]

Chapman et al.

[11] Patent Number: 5,977,962
[45] Date of Patent: Nov. 2, 1999

[54] TELEVISION BROWSING SYSTEM WITH TRANSMITTED AND RECEIVED KEYS AND ASSOCIATED INFORMATION

[75] Inventors: Joseph W. Chapman; Palma J. Cicchetti, both of Boston; Peter H. Fischman, Shirley; Elias Israel, Burlington; Hubert C. Mandeville, IV, Boston; Andrew Tannenbaum, Brookline, all of Mass.

[73] Assignee: CableSoft Corporation, Burlington, Mass.

[21] Appl. No.: 08/732,128

[22] Filed: Oct. 18, 1996

[51] Int. Cl.[6] .............................. H04H 1/02; H04H 7/08; H04H 7/10

[52] U.S. Cl. .......................... 345/327; 348/10; 348/465; 348/467; 348/478; 348/906; 455/6.2

[58] Field of Search ................................. 348/6, 8, 10, 11, 348/461, 465, 467, 468, 469, 473, 476, 477, 478, 479, 906, 463.9, 553, 563, 725, 728; 455/3.1, 4.1, 4.2, 62.1, 6.2; 345/326, 327; 386/83

[56] References Cited

U.S. PATENT DOCUMENTS

| | | | |
|---|---|---|---|
| 4,536,791 | 8/1985 | Campbell et al. | |
| 4,554,579 | 11/1985 | Citta | 358/86 |
| 4,734,764 | 3/1988 | Pocock et al. | 358/86 |
| 4,743,764 | 5/1988 | Casey et al. | 250/363 S |
| 4,792,849 | 12/1988 | McCalley et al. | 358/86 |
| 4,829,372 | 5/1989 | McCalley et al. | 358/86 |
| 4,860,123 | 8/1989 | McCalley et al. | 358/342 |
| 4,866,522 | 9/1989 | Beckley | 358/145 |
| 4,905,094 | 2/1990 | Pocock et al. | 358/342 |
| 4,941,040 | 7/1990 | Pocock et al. | 358/86 |
| 5,014,125 | 5/1991 | Pocock et al. | 358/86 |
| 5,077,607 | 12/1991 | Johnson et al. | 358/86 |
| 5,113,496 | 5/1992 | McCalley et al. | 395/200 |
| 5,119,188 | 6/1992 | McCalley et al. | 358/86 |
| 5,191,410 | 3/1993 | McCalley et al. | 358/86 |
| 5,195,092 | 3/1993 | Wilson et al. | 370/94.2 |
| 5,208,665 | 5/1993 | McCalley et al. | 358/86 |
| 5,440,632 | 8/1995 | Bacon et al. | 380/20 |
| 5,481,296 | 1/1996 | Cragun et al. | 348/13 |
| 5,481,542 | 1/1996 | Logston et al. | 370/94.2 |
| 5,485,221 | 1/1996 | Banker et al. | 348/563 |
| 5,488,425 | 1/1996 | Grimes | 348/559 |
| 5,493,339 | 2/1996 | Birch et al. | 348/461 |
| 5,539,920 | 7/1996 | Menand et al. | 455/5.1 |
| 5,689,799 | 11/1997 | Dougherty et al. | 455/2 |
| 5,848,352 | 12/1998 | Dougherty et al. | 455/5.1 |

OTHER PUBLICATIONS

"The Advanced Analog 8600X Home communications Terminal", Scientific–Atlanta, 1995, 1996 (Website).

"CFT–2200 Termianl Interactive Capable Baseband Addressable Terminal", General Instrument Corporation, 1995 (Website).

"Metrowerks Code Warrior Will Enable ISVs to Create Applications for New Interactive TV Operating System." Jun. 22, 1995, Metrowerks, Inc. (Website).

"With Opentv . . . Interactive Television is Open For Business", Sun Microsystems, Inc., 1995 (Website).

Introducing The CFT 2200 From General Instrument, "The CFT 2200 is Sight & Sound. Digital Audio For Your Stereo and Your TV From One Addressable Terminal", General Instrument.

*Primary Examiner*—John W. Miller
*Attorney, Agent, or Firm*—Hale and Dorr LLP

[57] ABSTRACT

A home-based television system has a set top box that receives from a cable operator television programs for broadcast on many channels. The set top box also receives additional information for display and an application. In response to user input, the application filters data in a first data stream, uses the filtered data to identify data in a second data stream, and causes the thus-identified data to be displayed.

39 Claims, 5 Drawing Sheets

# TELEVISION BROWSING SYSTEM WITH TRANSMITTED AND RECEIVED KEYS AND ASSOCIATED INFORMATION

BACKGROUND OF THE INVENTION

This invention relates to a broadband television network, and particularly a cable television system.

In many cable television systems, one or more television channels are dedicated to providing program information, local community information, and/or advertising (such as homes for sale). One channel that is commonly used for transmitting program information is the Prevue Channel, a commercial service that is available from Prevue Networks, Inc. of Tulsa, Okla. On the Prevue Channel, a cable company broadcasts a scrolling calendar of television shows on half of the television screen and advertising on the other half of the screen. With this service, a viewer must wait as long as four minutes for a schedule to scroll through a cycle of programs, and a user has no control over what or how program information is displayed.

Current set top boxes, such as the $8600^x$ Home Communications Terminal produced by Scientific Atlanta, Inc. of Norcross, Ga., have significant memory, e.g., 256 kB, for storing an application program and for storing other data for display. This home terminal is discussed, for example, in Banker, U.S. Pat. No. 5,485,221, which shows a block diagram of a set top box. When the user selects a menu button on a remote control, the set top box causes menus to be displayed. These menus have options that can be selected by the user with the remote.

A primary feature is an on-screen electronic program guide (EPG) that is similar in appearance to those found in newspapers in that it has columns of times and rows of channels with cells that identify programs. Using the remote control, a user can traverse these rows and columns. When a user selects a cell, the system switches directly to the program identified in the cell.

The memory in the set top box stores the application program that runs the system, the EPG, and other information for display as shown in FIG. 5 of the Banker patent. When the user selects a menu selection, the application program retrieves data stored in memory. The set top box therefore has memory for storing all the information for display, and therefore the amount of information that can be transmitted to the user is limited by the size of the memory.

The set top box is in a stand-by mode when it is not actively turned on. Updates are made to the data in memory after the set top box is turned off and thus put in the stand-by mode, and when the set top box is turned on again. This means, however, that there are no updates if the set top box is not turned off to the stand-by mode.

Another currently used set top box is the model CFT 2200 from General Instrument. This particular model uses a separate part of the spectrum for "out of band" transmission at a relatively low frequency (compared to the VHF channels) at a rate of about 14.2 kb/sec. This set box top also holds an entire program guide and other information in memory in the set top box.

SUMMARY OF THE INVENTION

According to the present invention, while television programs are continuously transmitted, additional information for display to the user, such as scheduling information and descriptive program information, is also transmitted from a cable headend. This information can be transmitted on scan lines during vertical blanking intervals (VBIs), on scan lines on a channel dedicated to data transmission, or encoded with digital program signals. The cable headend also continuously transmits an application that is stored as needed and executed by a processor in the set top box to filter the transmitted information in response to user inputs so that some portions of similar information are displayed to the user, while other portions of that information are not displayed and are discarded. The filtering is performed on data as it is received so that there is a small latency time apparent to the user. Because this other information is continuously transmitted, it is not necessary for the memory to store all of the information, and therefore a smaller memory than that in prior systems can be used, thus promoting flexibility and efficiency.

In preferred embodiments, a set top box for use with a television system has sufficient memory for receiving and storing the application and for buffering information for display as it is received, and a CPU for executing the application. Different methods for filtering the transmitted information can be used, depending on the number of categories of information, the quantity of data, and the number of choices of information for the categories. In the preferred embodiment, however, it is not necessary for memory to store an entire set of data, such as an entire program schedule, because information is filtered as it is continuously received such that selected information is buffered for display, while non-selected information is filtered out and discarded.

In another aspect, the invention includes a server at a cable headend and a method for operating such a server. The server is connected to data storage, such as a database, for transmitting data so that can be filtered at the set top box. For data that has many types that can be searched with different keys, a preferred transmitting approach is for the server to transmit blocks of data on one or more scan lines and to transmit keys associated with those blocks on one or more other scan lines. The keys and the blocks are transmitted as ordered byte streams that correspond to each other, preferably such that the n-th key is related to a corresponding n-th block of data from some initial reference. Related to this aspect of the invention is a system and method that allows the data to be continuously filtered by the set top box without the need to store all of the transmitted data, even if there are many choices and selections. The set top box has an application that receives the keys and blocks of data and uses the keys to identify desired blocks of data.

The present invention provides a convenient system in which a cable operator can use existing capacity to continuously transmit non-program information for display while transmitting television programs, and a user can select portions of that information for display in an interactive manner that mimics a client-server environment without requiring the user to be able to send data up to the headend. By continuously transmitting the application rather than requiring it to reside permanently in hardware, the application can be easily provided to each user when that user accesses the system, and it can be easily updated as desired to include new methods of filtering, new graphics, etc. By filtering information as it is transmitted rather than storing an entire program schedule or EPG, the required hardware for the set top box, particularly the memory, is minimized and much more information can be transmitted and accessed. The system can filter information with a latency per search that is controllable by the cable operator. Other features and advantages will become apparent from the following detailed description, drawings, and claims.

DETAILED DESCRIPTION

According to the present invention, a cable operator transmits television programs and other information for display at the same time and in a continuous manner. A user has an application that filters the continuously transmitted information in response to user inputs so that the user receives selected desired portions of information, and not other non-selected portions of information which can then be discarded.

In the United States, a television signal is divided in half in even and odd fields. Each half of the fields is refreshed 60 times per second in an interlaced manner, and thus an entire television image is refreshed 30 times per second. In Europe, the method is similar but the image is refreshed 50 times per second per field or 25 frames per second. Between the transmission of field information, there is a blank time, known as the vertical blanking interval (VBI), used by the television to reset its scanning position. The VBI is visible as a black line when the vertical hold on the television is maladjusted. During the VBI, 21 scan lines are transmitted, with one line being currently used during some programs to deliver closed captioning for the hearing impaired.

Figure 1:
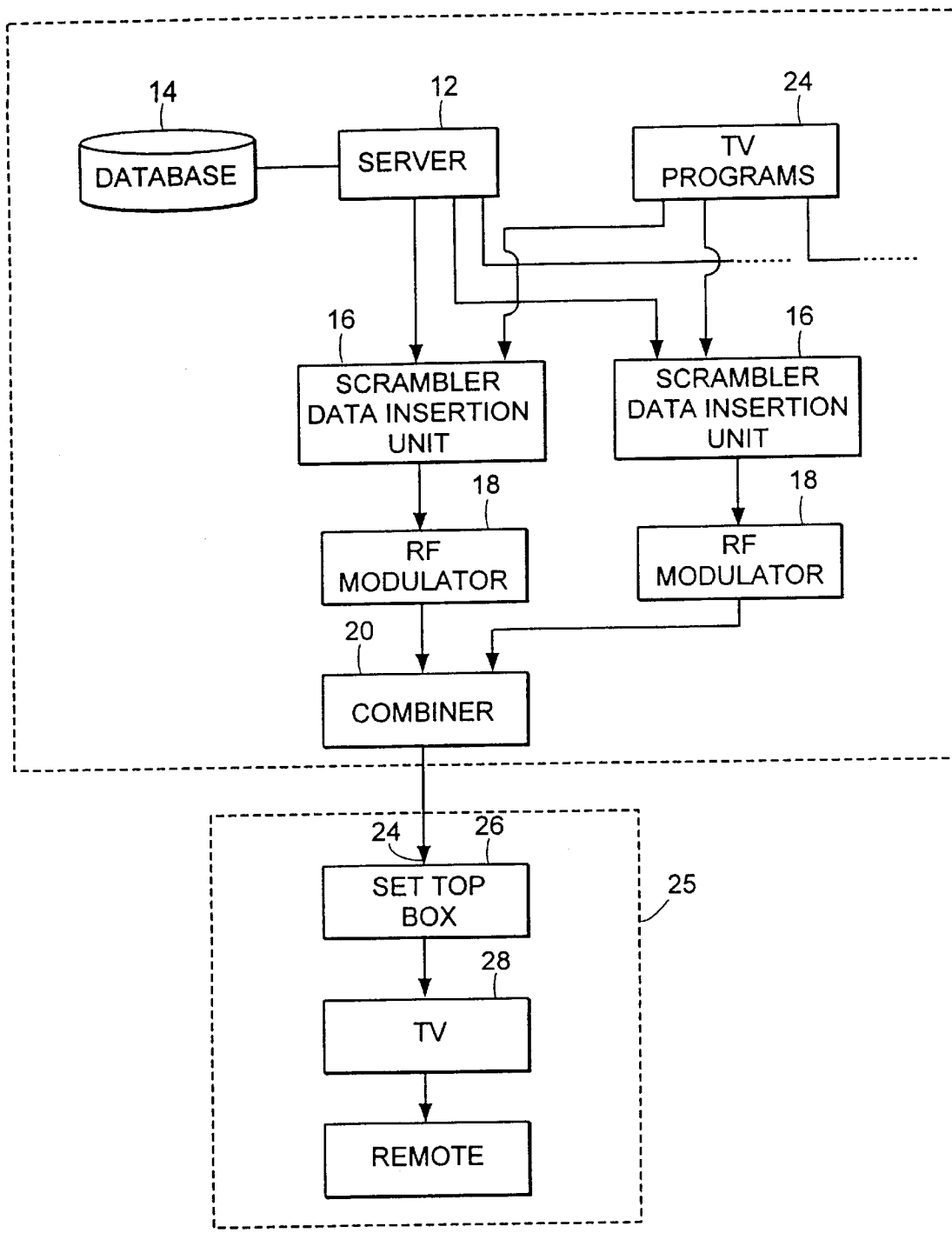
FIG. 1 is a block diagram of a cable television system according to the present invention.

In one embodiment of the present invention, the scan lines during the VBI are used to continuously transmit information for display. Referring to FIG. 1, a cable television provider has a headend 10 that includes a server 12 and a database 14. Database 14 stores information to be transmitted to a user for display, such as scheduling information, description program information, advertisements, and community information. Database 14 also stores an application for filtering the information transmitted by server 12 for display. This application preferably conforms to the Interactive Communicating Applications Protocol (ICAP) developed by Wink Communications, Inc. of Alameda, Calif. Server 12 provides the information from database 14 to one or more data insertion units (DIU) 16 which arrange the data into scan lines. Optionally, a scrambler can also be included with the DIU. Meanwhile, signals representing television programs 24, which can be obtained from various sources including satellites, fiber optic feeds, local transmission, and microwave transmission are also provided to DIUs 16. While there is a DIU 16 for each channel, the information from database 14 may be provided to all DIUs 16 or only to selected ones. The resulting signals are provided to RF modulators 18 that modulate each video signal to an appropriate slot in the video bandwidth, with one modulator 18 corresponding to each channel, and then to a combiner 20 that combines all of the television programs and other information together for transmission. The application and the other information for display from database 14 are thus effectively broadcast along with the television programs. The combined data is provided to an input port 24 of a home-based television system 25 that includes a set top box 26 connected to a user's television set 28. Alternatively, the set top box can be effectively built into the television.

In an embodiment similar to that shown in FIG. 1, the server can transmit most or all of its data to a single DIU 16 that is not connected to TV programs 24. In this case, a single channel is dedicated to data transmission, and all of its scan lines are dedicated to data transfer. This data channel would therefore not display television programs at all.

Figure 2:
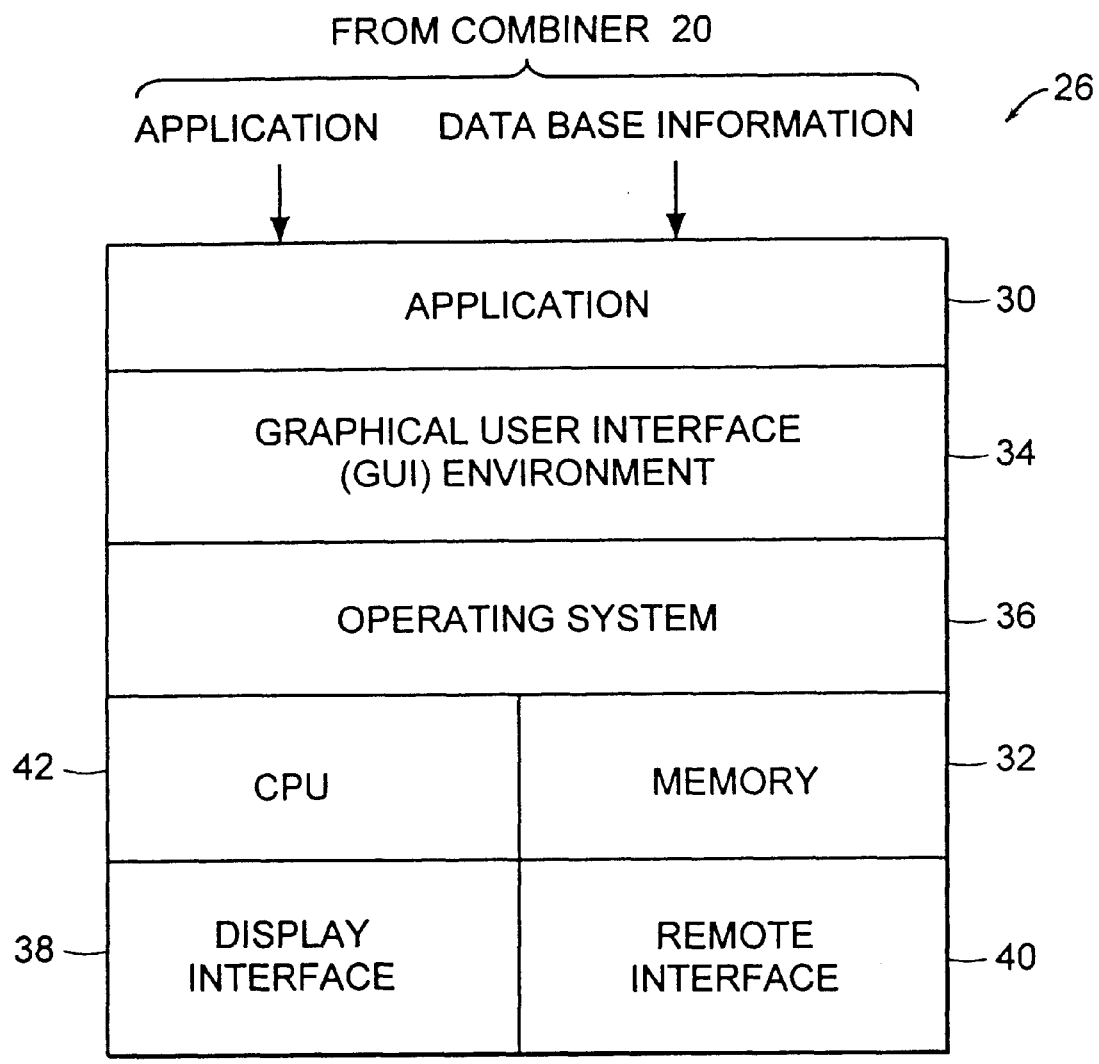
FIG. 2 is a block diagram of a set top box according to the present invention.

Referring also to FIG. 2, set top box 26 continuously receives application 30 and the other non-program information for display from database 14. Set top box 26 has an operating system 36 and a graphical user interface (GUI) environment 34, such as OpenTV, a product of the Thomson Sun Interactive Alliance; PowerTV available from PowerTV Inc. of Cupertino, Calif.; or the Java platform from Sun Microsystems, Inc. The preferred GUI environment is a Wink Engine available from Wink Communications of Alameda, Calif. Wink Communications also provides a design tool called Wink Studio that allows users to develop ICAP applications for use with the Wink Engine. The GUI environment interprets the applications and translates them into user interface and graphics capabilities for display on the television.

The application is continuously transmitted over one or more scan lines, preferably dedicated to the transmission of the application. The application therefore need not permanently reside in the set top box, and it can be replaced or updated conveniently from the headend. The application would not be sent completely during one VBI, but would be sent during a succession of VBIs. If the application does not change, the set top box will receive redundant data that can be discarded by application 30 as it is received. Although the application is transmitted, the operating system and the GUI preferably reside in the set top box permanently in that they do not have to be replaced with each use.

Set top box 26 also has computing hardware that includes a central processing unit (CPU) 42 that controls the operation of the set top box including executing the application, memory 32 such as random access memory (RAM) for storing the application and for temporarily storing transmitted information, a display interface for interfacing with the display on the television set, and a remote interface for receiving user inputs from a handheld remote control. These user inputs are typically infrared (IR) signals, but the remote control could be hard-wired to the set top box. The memory can be divided into a first memory for storing the application and a second memory for buffering the desired transmitted information prior to display. These first and second memories can be incorporated in one memory device or they can be physically separate if their separate tasks are better performed by different types of memory devices.

Figure 3:
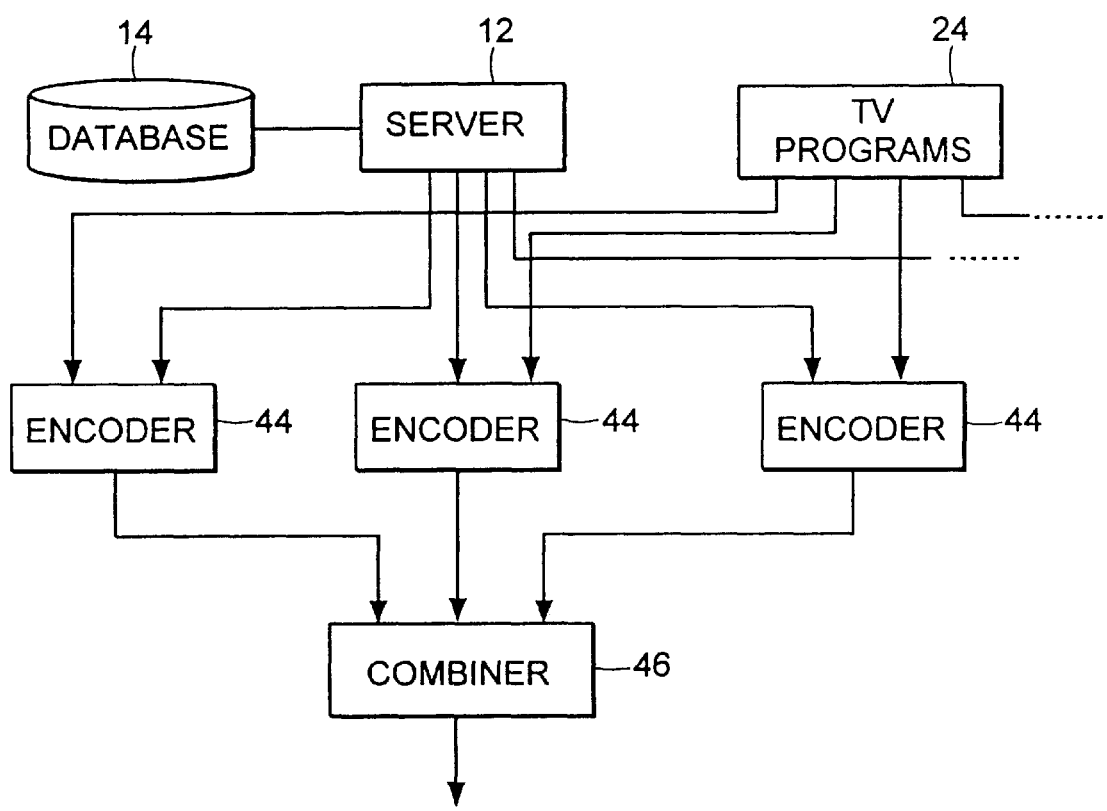
FIG. 3 is a block diagram of a cable television system according to another embodiment of the present invention.

Referring to FIG. 3, methods other than transmitting during the VBI, e.g. digital transmission, could be use to transmit the non-program information for display. In this case, analog television program signals for each channel are provided to a respective encoder 44 that includes RF modulation functionality. The digital application and other information for display are also provided to at least one of the encoders. Each encoder 44 combines the television program signals, the application, and the other information from the database to produce MPEG digital video to a combiner 46. The combiner combines all of the channels and transmits the digital data to a set top box similar to that shown in FIG. 2, except that it has an appropriate decoder for separating the video signal from the other digital information for display. Accordingly, while the description below is expressed primarily in terms of the transmission of information in scan lines during the VBI, the application and information can be transmitted with other methods of transmitting ordered byte streams continuously while the television programs are being transmitted.

Figure 4:
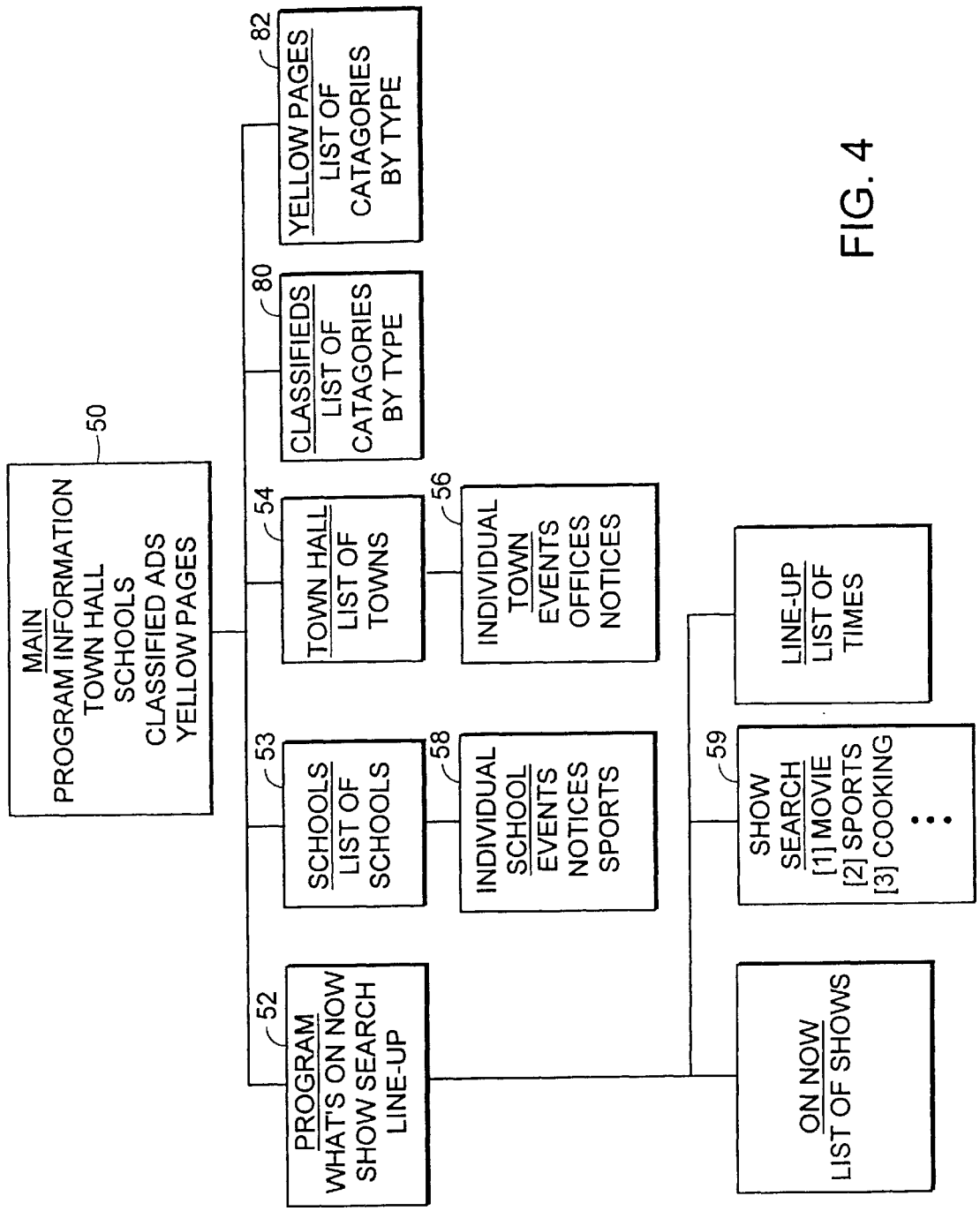
FIG. 4 is a menu chart that shows options with the system.

Referring also to FIG. 4, a user interacts with the set top box, preferably by using a remote control, to select from choices shown in menus displayed on the television screen. When a user first selects the television browser system of the present invention, preferably with a dedicated button on the remote control, the application causes the set top box to switch to a channel or one of a number of channels over which the information for display and the application are transmitted during scan lines of the VBIs. In response to this selection, after application 30 is downloaded, it causes a main menu 50 to be displayed with a number of different entries with broad categories. Exemplary main menu 50 has Program Information, Classified Ads, Yellow Pages, Town Hall, and Schools. The data for each of these categories is continuously broadcast during successive VBIs, preferably with one or more scan lines in the VBI being associated with each category or groups of categories or subcategory. These categories all have choices or subcategories that can be selected by the user with the remote control by traversing the displayed menus.

The transmitted data corresponding to the selected choice is filtered at the set top box by application 30 so that the user is provided with only selected portions of the transmitted information for display while other portions of that information are not displayed, even though all the information is actually received. Accordingly, while a significant quantity of data related to a number of choices of categories is being continuously transmitted one-way from the head end to the set top box, the system is effectively interactive in a way that mimics a client-server environment. While it appears to be such an environment, however, it is not necessary for data to be transmitted from the set top box to the headend.

The server at the cable headend (see FIG. 1) arranges the data for transmission, e.g., in scan lines during the VBI, such that the data can be searched by data filters in application 30. Different types of filters and arrangements of data can be used depending on the quantity of data and the number of different selections and choices within the desired category of information. A Schools menu 53 and Town Hall menu 54, for example have relatively few selections and a limited quantity of data which is preferably transmitted and filtered in a manner different from other broad categories.

Figure 5:
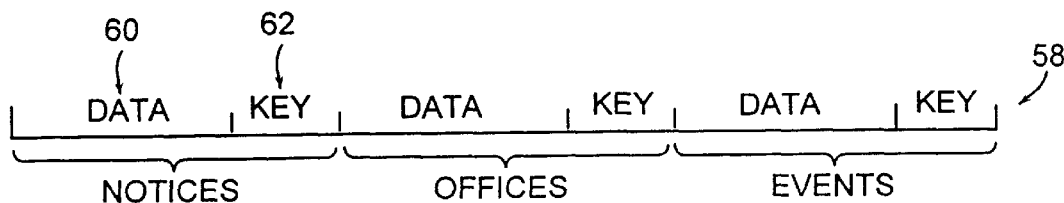
FIGS. 5 and 6 are representations of information transmitted according to the present invention.

An exemplary approach for transmitting and filtering Town Hall data is illustrated in FIG. 5. There are three selections for each town: offices, events, and notices. When a user selects Town Hall from main menu 50, application 30 provides a Town Hall menu 54 with a list of towns (or neighborhoods, boroughs, etc.) in the cable operator's area. For each town, there is a menu 56 that lists entries for events, offices, and notices. The data server transmits the data over one or more scan lines 58 dedicated only to Town Hall information. Scan line 58 carries blocks of data 60, each preceded by a key 62 used to type the data into the multiple selections. The amount of data that may be transmitted with each field during one scan line of one VBI is typically insufficient to transmit the complete set of Town Hall information, but the server can use a number of transmissions in successive VBIs to transmit all of the appropriate information. Data for the three Town Hall selections can be sent consecutively or alternatively, i.e., event key and event data can be sent with the fields 1, 4, 7, etc.; office key and office data with fields 2, 5, 8, etc.; and notice key and notice data with fields 3, 6, 9, etc. Alternatively, data for each category can be sent in scan lines during successive VBIs until completed for each selection within the Town Hall category.

If the selection is made for notices, application 30 checks the data stream to detect the key associated with notices. When found, data blocks associated with that key are temporarily kept in memory 32, which thus serves as a buffer for transmitting the data to the television set for display. The data to be displayed can be completely accumulated first before it is displayed, or certain blocks of data can be displayed as they are received to provide quicker response. Data blocks associated with the key of a non-selected selection are discarded. Because the data is continuously transmitted, it can be retrieved quickly because the data represents the desired information if effectively cycling through continuously.

The information for Schools can operate in a similar manner to the Town Hall. In this case, menu 53 lists individual schools and for each school, there is a menu 58 with three categories: events, notices, and sports. Consequently, if there are five schools, there would be a total of fifteen selections that could be encoded in a 4-bit (or more) key if desired. The data can be transmitted by the server and filtered at the set top box with a key that combines the selection and individual school as described above, or can be sorted first by school and then subsorted by selection. The school information can be on one or more dedicated VBI scan lines, or it could be combined with the town hall information on certain scan lines with a key for all the combinations of towns and schools and their respective sub-selections.

With such filtering, a user can thus make a selection from among different items of information under one category or type of information, and discard other information also in that same category type.

For other selections, the data is transmitted and the filtering is done in a different manner because of the larger number of different selections within the broad category and/or the larger quantity of data or sub-selections. If the user selects Program Information from main menu 50, the user gets a Program Menu 52 with three choices: What's on Now, Show Search, or Line-Up. To allow user no select from these choices, each television program has the following data associated with it: program name, program description, channel, start and stop time, and program category type. The name, channel, and start and stop times are self-explanatory. Program description can indicate the content of the program or episode, and would typically be limited to a certain maximum number of bytes.

The program category type is a key that can be associated with programs by the individual cable operator and can include broad groups, such as movie, sports, situation comedy, and drama; or the types can be much more specific, e.g., sports can be divided into sub-categories, or there can be selections for nature, education, police dramas, etc. The program category type can be searched by the user by selecting Show Search from Program Menu 52. In response, the application displays a menu 59 with a list of program category types from which the user selects a type.

Figure 6:
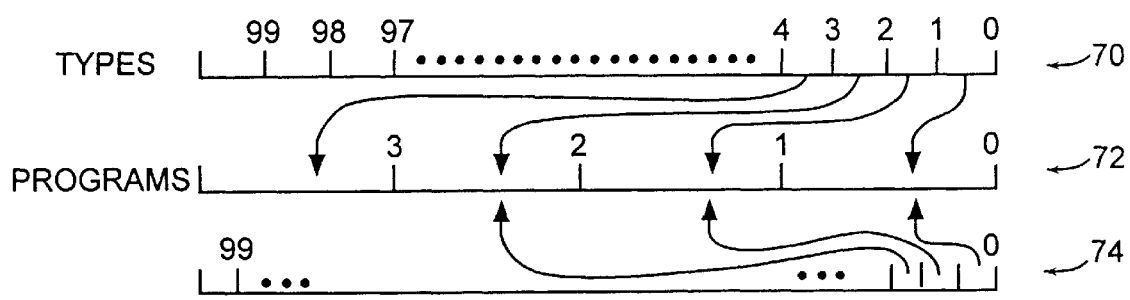

Referring to FIG. 6, in a preferred embodiment, the server uses at least one scan line 70 to transmit the category type keys for each program with the keys being concatenated in a ordered sequence in the scan line. On one or more other scan lines 72, the server transmits more detailed program information that can include some or all of the other fields associated with the program. The cable operator can provide the detailed program information over as many scan lines as desired, with more scan lines being used to reduce latency (delay) from selection to display to a time below a desired threshold.

When the application receives the user-selected program type(s), it checks each of the keys for that program category types transmitted on scan line 70. When the application detects the user-selected category type, it stores the program information from scan lines 72 associated with that program number. For example, if the third program on scan line 70 has the desired key, the application retrieves and stores in memory the information from scan line 72 in the corresponding third position. More generally, program category type keys and blocks of detailed program information are transmitted in at least two ordered byte streams such that a first data stream has keys such that an n-th key corresponds to the n-th block of detailed information in a second data stream. Accordingly, while program category type information may be transmitted continually for 100 separate programs, the filtering in the application allows the user to see information only about user-specified program category types, while filtering out and preferably discarding information for other program category types.

The Program Menu selection for What's On Now can operate in a similar manner. In this case, a separate scan line 74 carries start time and stop time information. In one embodiment, each program that has a start time within a half hour of the current time is stored for transmission; for earlier programs, the stop time is checked to determine whether the program is already finished. Alternatively, the key can simply be a time slot divided into each half-hour, in which case the set top box uses a clock to determine the current slot. As yet another alternative, the database and the server at the cable headend can cause only current programming to be transmitted over one scan line. Thus, part or all of the filtering for this particular selection may be controlled at the cable headend.

Referring again to FIG. 4, if the user selects classified ads or yellow pages from main menu 50, the user is provided with a classified ad menu 80 or a yellow pages menu 82, respectively. The method for filtering can be similar to either the method for filtering program information or the method for filtering Schools information, depending on the quantity of data and the number of types of categories desired by the cable operator. For classified ads, for example, a small number of broad-based categories can be used, such as personal/dating, sales, and employment opportunities; or there can be many different categories by dividing these groups into sub-groups, such as sales into sales of automobiles, musical instruments, household items, pets, etc., or employment into professional, sales, medical, etc. If there is a small number of keys corresponding to categories and a small number of ads, the data can be filtered in a similar manner to the Town Hall and School information with keys and blocks transmitted together over one or multiple scan lines.

If many categories are used and there is a large quantity of information, the data can be transmitted and filtered in a manner similar to the program information. As shown in FIG. 6, the category type scan line carries classified ad types as keys that indicate a classified ad based on its position, such that the n-th key in the type data stream would correspond to the n-th ad in the other data stream or streams.

As indicated above, one advantage of the transmission of the application rather than permanent storage is that the application can be conveniently updated. Accordingly, when the quantity of data is small, one filtering approach can be used; but the filtering approach can be changed as the quantity and/or categories of data increases.

For the Yellow Pages selection, typically many categories would be used. Consequently, the data would preferably be arranged like the program information as described in conjunction with FIG. 6.

As noted above, a field is transmitted 60 times per second, so scan lines during many VBIs can be obtained in a short period of time while providing the user with quick response. The cable operator can use the server to control the latency, i.e., response time, by its allocation of scan lines, with information over more lines providing less latency. If more data is added to certain selections but not others, the number of lines can be adjusted accordingly. While the system is receiving, filtering, and buffering information for display, the cable operator can display a sponsorship screen or a public service announcement for a set period of time. Such a screen can be transmitted as text over a dedicated scan line, and its time of display can be controlled by the application.

While program information and scheduling information would originate with the cable operator, the town hall information, school information, classified ads, and yellow pages entries can be received externally and entered into the database, or such information can be provided directly from the information provider through one of a number of different approaches. Using classified ads as an example, one approach for putting the classified ads in the database for transmission is to require that one who wants to place such an ad communicate the information to the cable operator in person, by telephone, or by mail or e-mail. In this case the cable operator effectively enters or re-enters the information into the database.

Alternatively, users can be provided with direct access to the database on-line to provide their information. For this option, the information provider is given a template for entering the information. This approach is particularly useful for regular users such as the local government or the local school department. Before being transmitted, the information can be checked by the cable operator for potentially objectionable words or phrases.

A preferred method for providing a larger amount of classified ads on the system is to have an interface with databases of newspapers that have significant number of classified ads. The cable operator and the newspaper can work together to establish categories for the ads, or standards can be used as they become developed (for example, Edgil Associates of Chelmsford, Mass., is developing categories used to convert ads from a newspaper's database into relational databases). Similarly for Yellow Pages, the cable operator can receive data from larger advertising directories with existing categories, or the cable operator can develop its own categories.

Having described embodiments of the present invention, it should be apparent that other modifications can be made without departing from the scope of the invention as defined by the appended claims. While the description above refers to a set top box, such a device need not be on top of the television set, but could be incorporated in the housing of the television set.

What is claimed is:

1. A method for implementation by a home-based television system, the method comprising:

receiving signals representing television programs for broadcast over many different channels;

receiving a series of keys including at least two different keys in a first data stream transmitted with the signals representing television programs;

receiving additional information associated with the keys in a second data stream transmitted with the signals representing television programs;

in response to user input indicating a desired category of information causing an application in the television system to search the first data stream to select from the series of keys in the first data stream a plurality of keys associated with the category;

retrieving, from the second data stream, the information associated with keys selected from the first data stream; and displaying the retrieved information and not displaying information associated with non-selected keys.

2. The method of claim 1, wherein the series of keys in the first data stream includes first, second, . . . n-th keys, and the second data stream has first, second, . . . n-th blocks of information such that the i-th key corresponds to the i-th block.

3. The method of claim 2, wherein the method is used to provide to the user a program guide, wherein receiving a series of keys includes receiving a series of keys, with the keys being arranged to categorize a number of different programs for viewing, and wherein the additional information includes information about each of the programs, the method further comprising providing to the user a menu of differed types of programs from which the user can select a desired category.

4. The method of claim 2, wherein the method is used to provide advertising to the user, wherein receiving a series of keys includes receiving a series of keys, with the keys being arranged to categorize different types of advertisements, and wherein the additional information includes advertisements, the method further comprising providing to the user a menu of different types of advertisements that the user can select for viewing.

5. The method of claim 1, wherein the method is used to provide to the user a program guide, wherein receiving a series of keys includes receiving a series of keys, with the keys being arranged to categorize a number of different programs for viewing, and wherein the additional information includes information about each of the programs, the method further comprising providing to the user a menu of different types of programs from which the user can select a desired category.

6. The method of claim 1, wherein the method is used to provide advertising to the user, wherein receiving a series of keys includes receiving a series of keys, with the keys being arranged to categorize different types of advertisements, and wherein the additional information includes advertisements, the method further comprising providing to the user a menu of different types of advertisements that the user can select for viewing.

7. The method of claim 1, wherein the first and second data streams are received as scan lines during vertical blanking intervals.

8. The method of claim 1, wherein the first and second data streams are received as digital signals encoded with digital signals representing television programs.

9. The method of claim 1, wherein a plurality of the applications are received from the cable head end.

10. The method of claim 9, wherein the application that is used for the searching is selected from one of a plurality of different applications received from the head end by the system, the system selecting one of the plurality of applications based on the desired category of information.

11. The method of claim 10, wherein the application is different depending on the quantity of additional information and/or a number of categories of information into which the additional information is divided.

12. The method of claim 9, wherein the application received from the cable head end includes a user interface with graphics for a user to interact prior to the application identifying at least one key.

13. The method of claim 9, wherein the series of keys and the application are transmitted over vertical blanking interval lines.

14. The method of claim 1, wherein at least some of the keys include a combination of a first category of information and a second category of information, and wherein the selecting includes selecting a desired key matching both the first and second categories.

15. The method of claim 14, wherein the first category includes a location and the second category includes information, some of which is associated with one location and some of which is associated with another location, whereby the user can search for a desired type of information in a desired location.

16. The method of claim 14, wherein the series of keys are transmitted over vertical blanking interval lines.

17. The method of claim 1, further comprising displaying a sponsorship screen during a delay while the searching is performed.

18. A method for use by cable operator connected to a large number of home-based television systems, the method comprising:

transmitting signals representing television programs for broadcast over many different channels;

transmitting a series of keys in a first data stream;

transmitting additional information other than television programs for display in a second data stream, the additional information being provided along with the television programs and being for display to users, wherein the additional information is divided into blocks, with each block being associated with a key in the first data system; and transmitting a plurality of different applications for searching the additional information, including a first application for a first type of additional information and a second application for a second type of additional information, wherein one of the first and second applications is responsive to user input requests for one of the first and second types of additional information for selecting keys associated with the desire category from the first data stream and for using selected keys to retrieve blocks of the additional information associated with selected keys.

19. The method of claim 18, wherein the transmitting of keys, additional information, and applications are performed over scan lines during vertical blanking intervals, such that the keys are transmitted over one or more scan lines and the blocks of additional information are transmitted over one or more other scan lines.

20. The method of claim 18, wherein the transmitting steps are performed by encoding together as digital signals the signals representing television programs and the additional information.

21. The method of claim 18, wherein the method is for the transmission of a television program guide, wherein transmitting a series of keys includes transmitting keys corresponding to different types of programs, and transmitting additional information includes transmitting program guide information.

22. The method of claim 18, wherein the method is for the transmission of advertising, wherein transmitting a series of keys includes transmitting keys corresponding to different types of advertisements, and transmitting additional information includes transmitting advertisements.

23. The method of claim 18, wherein the first data stream has keys with the i-th key corresponding to the i-th block in the second data stream.

24. A home-b&ed television system comprising:

an input port for receiving signals representing television programs for broadcast over many different channels, and for continuously receiving signals representing information for display other than television programs;

a display for displaying the television programs and the other information;

memory including a first memory for storing an application and a second memory for buffering the information for display;

a processor for executing the application in the first memory in response lo user input indicating a desired category of information, the executed application for searching a first data stream as that data is received to retrieve keys associated with the desired category, using the retrieved data from the first stream to identify data in a second data stream and causing the data identified in the second data stream to be displayed on the display; and an interface for receiving input from a user-operable input device, the input selecting a choice from among the menu of choices.

25. The system of claim 24, wherein the interface input device is a hand-held remote control, and the memory is housed in a set top box.

26. The system of claim 24, wherein the input port receives the signals representing information for display in vertical blanking interval lines.

27. The system of claim 24, wherein the memory stores first and second applications, the processor selecting one of the first and second applications for execution depending on the desired category of information.

28. The system of claim 27, wherein the first and second applications have different methods for searching.

29. The system of claim 24, wherein at least some of the keys have a first and a second characteristic, and wherein the application searches for keys having both the first and second characteristics.

30. A method for implementation by a home-based television system, the method comprising:

receiving signals representing television programs for broadcast over many different channels;

receiving a series of keys including at least two different keys in a first data stream transmitted with the signals representing television programs;

receiving additional information associated with the keys in a second data stream transmitted with the signals representing television programs;

receiving from a cable head end a first application with a first method for searching for keys in the first data stream relating to a first class of information, and a second application with a second method for searching for keys in the first data stream relating to a second class of information;

in response to user input indicating information from the first class of information, selecting a plurality of keys from the first data stream in accordance with the searching method corresponding to the first class category of information;

retrieving, from the second data stream, the information associated with keys identified in the first data stream; and displaying the retrieved information and not displaying information associated with non-selected keys.

31. The method of claim 30 wherein receiving applications includes receiving applications with at least two different methods for identifying a desired key.

32. The method of claim 30, wherein the applications include a user interface and graphics for display.

33. The method of claim 30, wherein the application is transmitted over the vertical blanking interval lines.

34. The method of claim 30, wherein the additional information includes yellow pages information.

35. The method of claim 30, wherein the additional information includes information about classified advertisements.

36. The method of claim 30, wherein the additional information includes a program guide.

37. A method for implementation by a home-based television system, the method comprising:

receiving signals representing television programs for broadcast over many different channels;

receiving a series of keys including at least two different types of keys in a first data stream transmitted with the signals representing television programs;

receiving additional information associated with the keys in a second data stream transmitted with the signals representing television programs;

in response to user input indicating a desired set of information that has both a first characteristic and a second characteristic an application in the television system identifying keys in the first data stream that have both the first and second characteristics;

retrieving, from the second data stream, the information associated with identified keys in the first data stream; and displaying the retrieved information and not displaying information associated with non-selected keys.

38. The method of claim 37, wherein the system identifies keys that have the first characteristic, then identifies keys out of the keys with the first characteristic that also have the second characteristic.

39. The method of claim 37, wherein the first and second characteristics include a location and a type of information.

* * * * *